United States Patent [19]

Perreault et al.

[11] Patent Number: 5,608,727

[45] Date of Patent: Mar. 4, 1997

[54] METHOD AND SYSTEM FOR MANAGEMENT OF FREQUENCY SPECTRUM AMONG MULTIPLE APPLICATIONS ON A SHARED MEDIUM

[75] Inventors: John A. Perreault, Hopkinton; Abhay Joshi, Norwood, both of Mass.; Albert Chen, Hoffman Estates; Eva Labowicz, Elk Grove, both of Ill.

[73] Assignee: Motorola, Inc., Schaumburg, Ill.

[21] Appl. No.: 433,878

[22] Filed: May 2, 1995

[51] Int. Cl.⁶ .................................................... H04J 1/10
[52] U.S. Cl. ........................ 370/462; 375/200; 455/34.1
[58] Field of Search .............................. 370/69.1, 17, 50, 370/44.1, 60, 18, 20, 21, 118, 95.1, 95.2, 95.3, 85.7, 85.8; 375/200, 201, 202, 203, 204, 205, 240; 348/384; 455/34.1, 54.2

[56] References Cited

U.S. PATENT DOCUMENTS

| 4,528,656 | 7/1985 | Mosais | 370/69.1 |
|---|---|---|---|
| 5,295,154 | 3/1994 | Müer et al. | 375/200 |
| 5,329,591 | 7/1994 | Magrill | 375/200 |
| 5,436,973 | 7/1995 | Amoroso | 375/200 |

*Primary Examiner*—Benedict V. Safourek
*Assistant Examiner*—Dang Ton
*Attorney, Agent, or Firm*—Darleen J. Stockley

[57] ABSTRACT

Frequency spectrum management provides for dynamic spectrum usage adjustment among applications on a shared medium. Dynamic resource management methods are applied to the problem of managing spectrum and matching application specific requirements to real-time spectrum characteristics so that more optimal use of the available spectrum may be made. At least a first spectrum agent is assigned to each of the plurality of different applications, for managing channels allocated to the application, and a spectrum manager allocates frequency channels to the plurality of different applications based on the following at least one of parameters of a frequency channel required to implement the application and predetermined requirements based on time of day demand changes for the application.

30 Claims, 2 Drawing Sheets

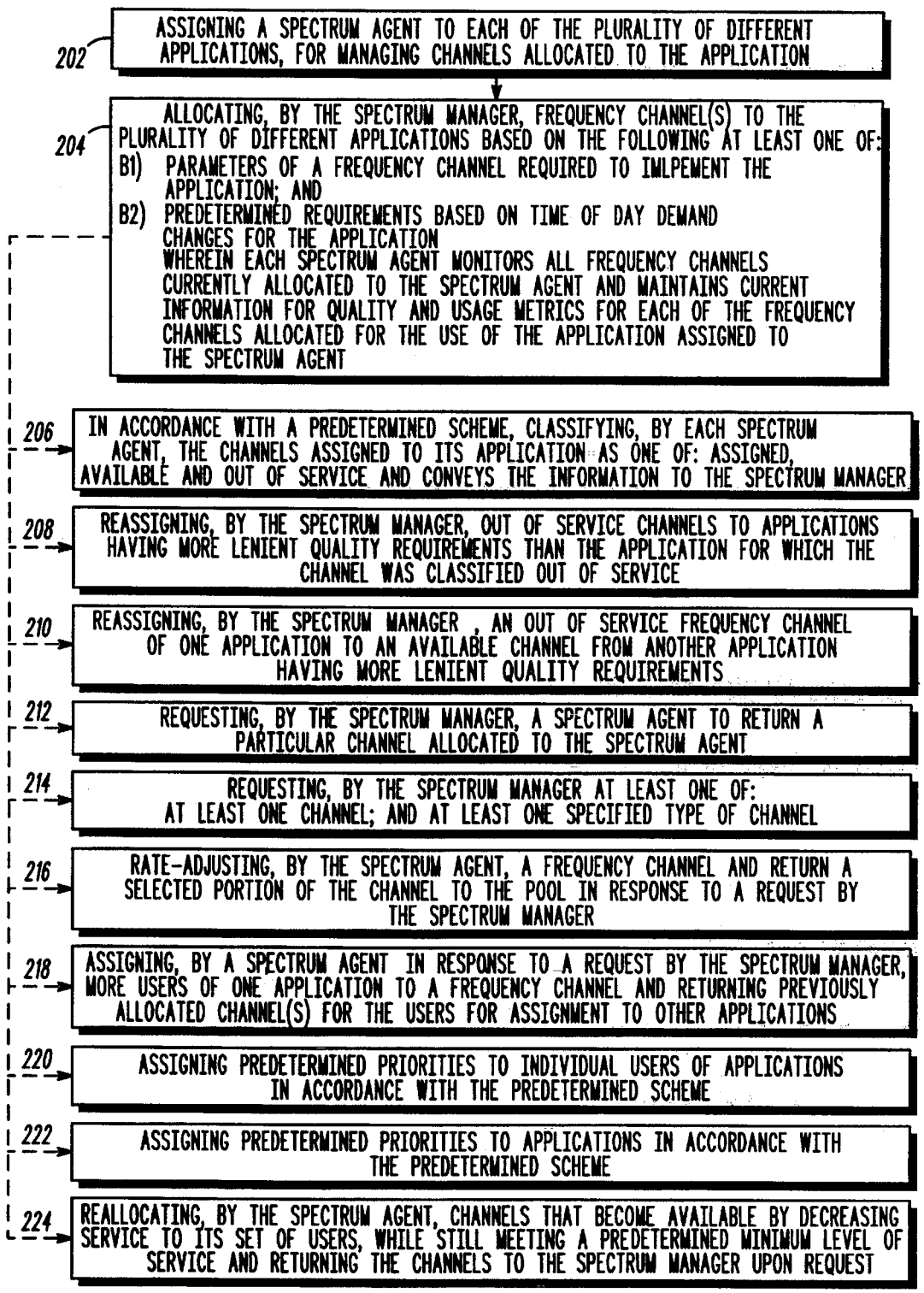

METHOD AND SYSTEM FOR MANAGEMENT OF FREQUENCY SPECTRUM AMONG MULTIPLE APPLICATIONS ON A SHARED MEDIUM

CO-PENDING APPLICATIONS

The present application may be related to co-pending applications: CX095004, Ser. No. 08/432,749, METHOD AND APPARATUS FOR A HYBRID CONTENTION AND POLLING PROTOCOL by Abhay Joshi, Mete Kabatepe, Lawrence W. Lloyd, John A. Perreault, and Stephen Schroeder, filed May 2, 1995, Last Office Action was sending in Missing Parts on Jun. 23, 1995; CX095005, Ser. No. 08/433,905, METHOD AND SYSTEM FOR PROVIDING ACCESS BY SECONDARY STATIONS TO A SHARED TRANSMISSION MEDIUM, by Abhay Joshi, Mete Kabatepe, Lawrence W. Lloyd, John A. Perreault, and Stephen Schroeder, filed May 2, 1995, Last Office Action was sending in Missing Parts on Jun. 23, 1995; CX095007, Ser. No. 08/433,877, METHOD AND APPARATUS FOR MULTILING POLLING, by Abhay Joshi, Mete Kabatepe, Lawrence W. Lloyd, John A. Perreault, and Stephen Schroeder, filed May 2, 1995, Last Office Action was a rejection on Jan. 4, 1996; CX095009, Ser. No. 08/437,106, METHOD AND APPARATUS FOR A HYBRID LIMITED CONTENTION AND POLLING PROTOCOL, by Abhay Joshi, Mete Kabatepe, Lawrence W. Lloyd, John A. Perreault, and Stephen Schroeder, filed May 5, 1995, Last Office Action was sending in Missing Parts on Jun. 23, 1995; CX095011, Ser. No. 08/533,876, SYSTEM AND METHOD FOR HYBRID CONTENTION/POLLING PROTOCOL COLLISION RESOLUTION USING A COLLISION RESOLUTION USING A DEPTH FIRST SEARCH TECHNIQUE, by Abhay Joshi, Mete Kabatepe, Lawrence W. Lloyd, John A. Perreault, And Stephen Schroeder, filed May 2, 1995, Last Office Action was sending in Missing Parts on Jun. 23, 1995; and CX095012, Ser. No. 08/434,334, METHOD AND SYSTEM FOR MANAGEMENT OF FREQUENCY SPECTRUM AMONG MULTIPLE APPLICATIONS ON A SHARED MEDIUM, by Abhay Joshi, Mete Kabatepe, Lawrence W. Lloyd, John A. Perreault, and Stephen Schroeder, filed May 2, 1995, Last Office Action was sending in Missing Parts on Jun. 23, 1995.

FIELD OF THE INVENTION

The present invention relates to spectrum management in communication systems, and more particularly, to spectrum management among multiple applications in communication systems.

BACKGROUND

Mechanisms for sharing frequency spectrum among various applications statically typically allocate a portion of the spectrum to each of the applications within a service area. This allocation cannot be undone without disabling the applications. Also, current mechanisms do not take into consideration the suitability of the allocated spectrum for serving a specific application.

Hence, current spectrum management approaches suffer from the following drawbacks:

Current algorithms do not allow dynamic sharing of spectrum between applications supported in a service area.

The algorithms used do not take into account the specific communications requirements associated with each specific application that is using spectrum. For example, the quality of a band of spectrum may be suitable for one application but not for another at any given instant of time. Hence, spectrum statically allocated to a specific application may not be the most suitable spectrum for that application.

Once allocated to an application, spectrum cannot be deallocated without disabling the application. If the application designates a portion of, or the entire spectrum allocated to it as unusable, that spectrum is wasted even though that spectrum may have been useful for some other application within the service area.

The characteristics of spectrum change over time. Hence, if some specific spectrum is suitable for the use of an application currently, it may not be suitable over all the time period that it is allocated to the application, resulting in poor service to the application's users over time. The present static spectrum allocation mechanisms do not characterize spectrum characteristics by Time of Day (TOD) and intelligently determine spectrum usability for different TODs.

An individual application may have the ability to shrink its spectrum usage and free up spectrum for the use of other higher priority applications within the service area by reducing or denying service to some of its users. Current spectrum management mechanisms do not allow this dynamic spectrum usage adjustment.

Thus, there is a need for a method and system of frequency spectrum management that provides for dynamic spectrum usage adjustment among applications on a shared medium.

BRIEF DESCRIPTION OF THE DRAWINGS

FIG. 2 is a flow chart of one embodiment of steps in accordance with the method of the present invention.

DETAILED DESCRIPTION OF A PREFERRED EMBODIMENT

Figure 1:
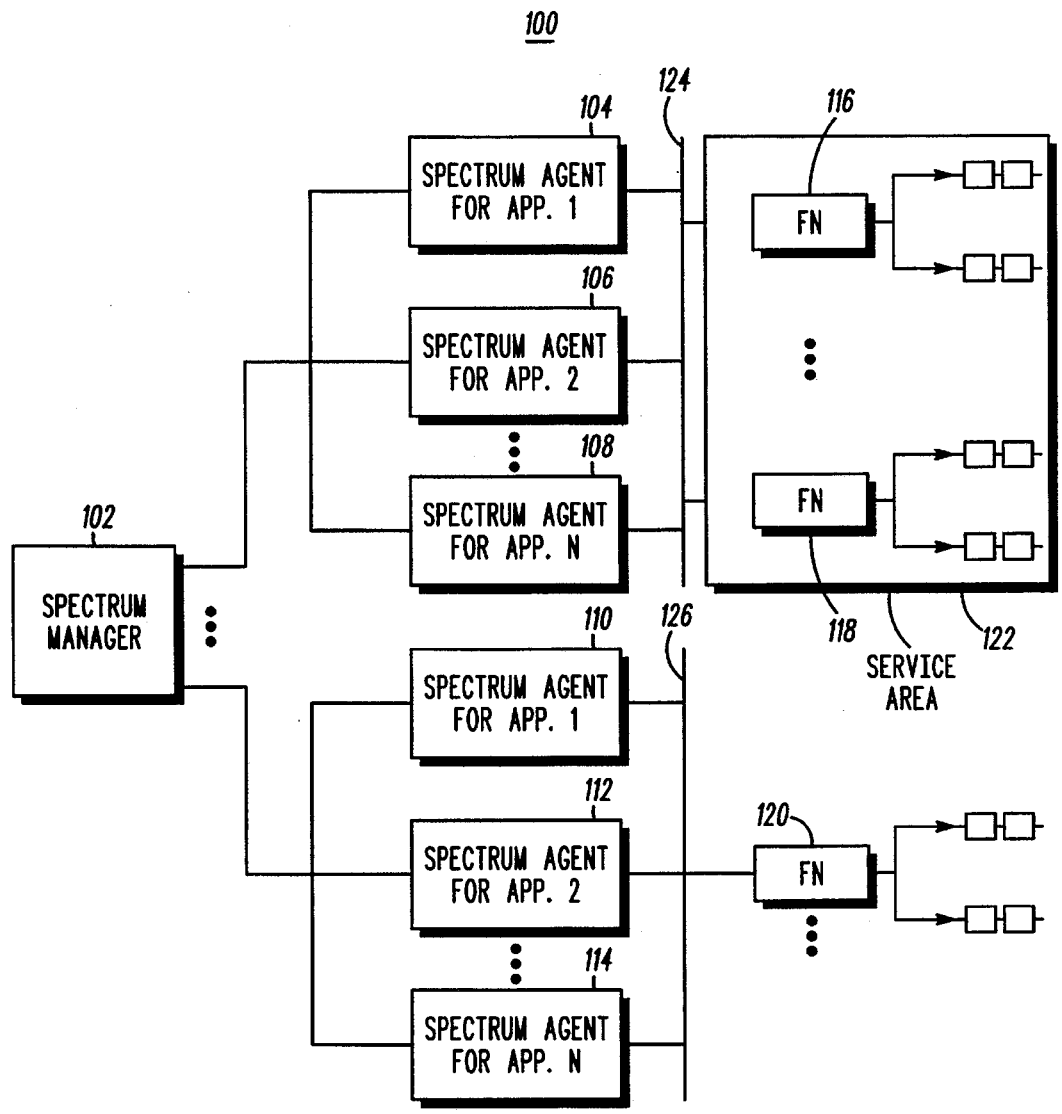
FIG. 1 is a block diagram of a system suitable for implementing the method of the present invention.

The present invention applies dynamic resource management methods to the problem of managing spectrum and matching application specific requirements to real-time spectrum characteristics so that more optimal use of the available spectrum may be made. Though wireless systems utilize dynamic carrier sharing that provides for sharing of available carriers among cells, applications are not matched to real-time spectrum characteristics.

Dynamic resource management is accomplished in the present invention by: 1) monitoring of channels for quality level (a measured quality level); 2) determining related characteristics, e.g., channel speed, propagation delay (maximum and minimum), etc., automatically; 3) maintaining a history of channel quality to be used for detecting trends; 4) applying characteristics to channels (e.g., channel speed, propagation delay, quality level, stability, etc.); 5) prioritizing channels for specific applications (e.g., voice, data, etc.) based on the characteristics of the channel; 6) allocating specific channels that are suitable for the use of specific applications to those applications; and 7) monitoring usage characteristics and channel characteristics of channels allocated to each application and allocating or deallocating channels to applications to maintain service to the application's users.

Typically, radio frequency (RF) spectrum is allocated for multiple applications, e.g., data, voice, and video, in a broadband cable network. The RF spectrum is generally sharable within a serving area. Dynamic allocation of the RF spectrum provides efficiency and convenience to the users. Referring to FIG. 1, numeral 100, the spectrum manager is responsible for the overall management of the spectrum allocated for its use in one or more service areas. Within a service area, a spectrum manager (102) dynamically allocates and deallocates spectrum for the use of individual applications like voice, data, video etc.

Allocation of spectrum by the spectrum manager (102) is done by allocating frequency channels suitable for the use of each of the applications within the service area. The specific frequency channels allocated depend on the nature of the application and its requirements. Spectrum agents (104, 106, ..., 108; 110, 112, ... 114) manage channels allocated to an application (APP. 1, 2, ... N, N a positive integer) and assign and deassign individual users of the application to the frequency channels. The spectrum agents (104, 106, ..., 108; 110, 112, ... 114) are responsible for serving all the application's users within a service area (122, ...). Within a service area more than one spectrum agent may serve the same application, but for distinct users.

The service area (122, ...) may contain one or more fiber nodes (FN; 116, ..., 118; 120, ...) with the restriction that a frequency channel assigned by the spectrum agent is shared by all the fiber nodes within the service area (FN 116, ..., 118), i.e., where a frequency channel (124) is designated as assigned on one fiber node (e.g., 116), it is also considered to be assigned on the other fiber nodes (..., 118) within that service area. The fiber node may serve multiple individual users that may use different applications.

The spectrum manager manages a channel pool (124, 126, ...) allocated to one or more service areas. Each service area (122, ...) has a frequency channel pool (124, ...) allocated, which is shared by various applications (telephony, data, video) under the control of the spectrum manager (102). Each application (APP. 1, ... N) has its own spectrum agent (104, 106, ..., 108; 110, 112, ... 114), which manages channels allocated to the application. Within a service area more than one spectrum agent may serve the same application, but for distinct users. Typically, the spectrum manager is a centralized controller, e.g., a microprocessor, and the spectrum agents are independent slaves managed by the centralized controller. Where selected, the spectrum agents may be collocated with the spectrum manager. The spectrum manager (102) makes decisions on channel allocation to the various applications based on at least the following two considerations:

1) Frequency channels are allocated to applications based on their suitability of use for that specific application. The parameters of a frequency channel to be considered for determining its suitability are its quality, bandwidth and intermediate frequency. This applies for both upstream and downstream channels. Channel quality is a measure of the current error rate and the stability of the channel. Stability is a measure of how frequently (or infrequently) and for what time duration, the channel experiences errors during its operation. Channel bandwidth is the spectral width of the channel. Each application operating within the service area has specific requirements of channel quality and channel bandwidth. For example a data application may not tolerate channel errors as well as a voice application. The quality, bandwidth and intermediate frequency required by an application will depend on the modulation used on the transmission medium by that application.

2) Frequency channels may be allocated to applications for their requirements based on their time of day demand changes. The time of day (TOD) demand could be based on a configured requirement for each of the applications at various TODs or based on historical information on each of the application's TOD demand. The historical information will be built over time by monitoring the demand of each of the applications. The spectrum manager will use this information to adjust the channel allocation between the applications based on their TOD requirements. Frequency channels are also characterized by their TOD behavior. For example some frequency channels may historically present a bad quality (high error rate) at certain TODs. This channel could be defined to be usable by some applications and not usable by some other applications at various TOD. The spectrum manager will use this information to assign certain specific channels to specific applications whose quality requirements will be satisfied by those channels at that TOD.

FIG. 2, numeral 200, is a flow chart of one embodiment of steps in accordance with the method of the present invention. The method provides efficient management of a channel pool that is allocated among a plurality of different applications and has a predetermined number of frequency channels for a plurality of users in a communication system, wherein spectrum frequency of the channel pool is dynamically spread among the plurality of different applications to optimize provision of application requirements for applications in use. The method includes the steps of: A) assigning at least a first spectrum agent of the plurality of spectrum agents to each of the plurality of different applications, for managing channels allocated to the application; and B) allocating, by the spectrum manager, frequency channel(s) to the plurality of different applications based on the following at least one of: B1) parameters of a frequency channel required to implement the application; and B2) predetermined requirements based on time of day demand changes for the application, wherein the at least first spectrum agent monitors all frequency channels currently allocated to the at least first spectrum agent and maintains current information for quality and usage metrics for each of the frequency channels allocated for the use of the application assigned to the at least first spectrum agent.

Where selected, coaxial cable may be utilized to couple at least some of the plurality of users to the communication system. Also, where selected, fiber optic cable may be utilized to couple at least some of the plurality of users to the communication system.

Each spectrum agent monitors all the frequency channels currently allocated to it and maintains current information of the quality and usage metrics of each of the frequency channels allocated for the use of its application. Based on this information, each spectrum agent classifies the channels assigned to its application as assigned, available and out of service and conveys this information to the spectrum manager (206). Typically, "assigned" means that the requirements of the application assigned to the channel are met and the channel is currently in use. "Available" means that the requirements of the application assigned to the channel are met, but the channel is not currently in use. "Out of service" means that the requirements of the application are unmet.

Hence the spectrum manager has current information about the quality of the channels allocated to each of the applications under its control. This allows the spectrum manager to request the applications to reallocate out of service channels (208) that may be suitable for use by applications having more lenient quality requirements.

Similarly, the frequency spectrum manager may also switch (210) a frequency channel from the out of service list of one application with an available channel from another application having more lenient quality requirements. Thus, based on current information of the frequency channel usage of each application, the spectrum manager may reassign allocated channels.

Based on the criteria for allocating channels to applications, the spectrum manager may request any spectrum agent to return a specific channel (212) it has been allocated. Such a channel may be in the spectrum agent's assigned, available or out of service channel list. For example, where needed, the spectrum manager may use this capability to merge contiguous frequency channels to create a channel where more spectral bandwidth is required than is available in a single channel.

In addition, the spectrum manager may request any of the spectrum agents to return one or a number of any allocated channels (214). Where the spectrum manager does not specify which specific channel is to be returned, but only specifies the number and type of channels to be returned by the spectrum agent, the spectrum agent may respond by returning the requested number of channels of the specified type (214) so that the channels may be reallocated to other applications. A type of channel means that a channel's parameters, i.e., quality, bandwidth, and intermediate frequency, meet a minimal set of requirements that is determined by the spectrum manager based on the application for which it is requesting the channel.

Further, the spectrum manager may request a spectrum agent to rate-adjust a frequency channel (216) and return a portion of the channel. For example, some modulation techniques allow the usage of varying spectrum, and hence the spectrum agents for applications using such a modulation technique may return a portion of a channel.

In some instances, some applications may use all the usable channels from the channels allocated to them by the spectrum manager. If required, these applications may shrink their channel usage by concentrating their users on fewer frequency channels than would be normally used if the network used by said applications is not heavily utilized. The spectrum manager can request such applications to assign users to fewer channels (218) and return some allocated channels from the assigned list of channels to serve other applications which may have a shortage of channels. Subsequently, if the channels become available again, the spectrum manager will return them to the original owner and allow the application to distribute users on all available channels. Such a mechanism provides maximum flexibility of channel usage to the application and the spectrum manager while providing the most efficient service to the users.

Where desired, priorities may be given (220) to various applications and also for individual users (222) within each application. This priority information may be used by the spectrum agent to grant or deny a request made by the spectrum manager for a frequency channel. For example, if the spectrum manager requests any single channel from a spectrum agent with priority p (p a selected priority level value), the spectrum agent will grant that request if: 1) channels are listed in its available list or out of service list or 2) all the frequency channels allocated to the spectrum agent are assigned, but a channel may be made available by denying service to some users who have a service priority of less than p. Where selected, this mechanism may be utilized to guarantee access to a frequency channel for a critical application. Thus, predetermined priorities may be assigned to applications in accordance with a predetermined scheme. Further, predetermined priorities may be assigned to individual users of applications in accordance with the predetermined scheme.

The spectrum agent may also make channels available by decreasing service to its set of users (224), while still meeting an acceptable (minimum) level of service and return the available channels to the spectrum manager when a critical application needs channels. Thus, an application may selectably degrade service to its users instead of denying service. This is particularly suitable for applications which may operate end-to-end at variable rates (e.g., digital voice using coding algorithms PCM, ADPCM, VSELP).

The spectrum manager has information about the bandwidth and guard band requirements of the frequency channels required by each of the applications under its control. Hence the spectrum manager may combine channels, divide channels and manage the guard bands between the channels when it combines or divides channels.

This invention provides a solution to the problem of optimizing the allocation of available spectrum of varying quality on a shared medium (e.g., coaxial cable, etc.) to multiple applications (e.g., data, telephony, video, etc.) with multiple users. Spectrum suitable for the use of an application is allocated for the application's use so that the application user's requirements may be maintained.

Time of day changes in the ability of specific spectrum to serve an application's requirements are monitored and, when changes in a channel cause the channel characteristics to fail to meet the application's requirements, the spectrum manager utilizes the above techniques to provide a channel that satisfies the application user's communication requirements.

Another advantage is that spectrum designated unusable by one application is not wasted if it can be used by another application which needs spectrum.

Spectrum usage within an application may be changed by rate-adjustment, by denying service to lower priority users to provide spectrum for higher priority applications, or by providing degraded but acceptable performance.

We claim:

1. A method of efficient management of a channel pool that is allocated among a plurality of different applications and has a predetermined number of frequency channels for a plurality of users in a communication system, wherein spectrum frequency of the channel pool is dynamically spread among the plurality of different applications to optimize provision of application requirements for the plurality of different applications in use, comprising the steps of:

A) assigning at least a first spectrum agent to each of the plurality of different applications, for managing channels allocated to the application;

B) allocating, by a spectrum manager, frequency channel/channels to the plurality of different applications based on the following at least one of:

B1) parameters of a frequency channel required to implement an application of the plurality of different applications; and B2) predetermined requirements based on time of day demand changes for the application, wherein the at least first spectrum agent monitors all frequency channels currently allocated to the at least first spectrum agent and maintains current information for quality and usage metrics for each of the frequency channels allocated for the use of the application assigned to the at least first spectrum agent.

2. The method of claim 1 wherein coaxial cable is utilized to couple at least some of the plurality of users to the communication system.

3. The method of claim 1 wherein fiber optic cable is utilized to couple at least some of the plurality of users to the communication system.

4. The method of claim 1 wherein the parameters of the frequency channel required to implement the application include at least one of: quality, bandwidth and intermediate frequency.

5. The method of claim 1 wherein time of day requirements are based on one of:

a requirement reconfigured for the application at predetermined times of day, and historical information on the application's time of day requirements.

6. The method of claim 1 wherein, in accordance with a predetermined scheme, the at least first spectrum agent classifies the channels assigned to the at least first spectrum agent's application as one of: assigned, available and out of service and conveying the information to the spectrum manager.

7. The method of claim 6 wherein the at least first spectrum agent further reassigns out of service channels to applications having more lenient quality requirements than the application for which a channel was classified out of service.

8. The method of claim 6 wherein the at least first spectrum manager further reassigns an out of service frequency channel of one application to an available channel from another application having more lenient quality requirements.

9. The method of claim 1 including requesting, by the spectrum manager, at least one spectrum agent of the plurality of spectrum agents to return a particular channel allocated to the at least one spectrum agent.

10. The method of claim 1 including requesting, by the spectrum manager at least one of:

at least one channel; and at least one prioritizing channel for a specific application based on the characteristics of the channel.

11. The method of claim 1 including rate-adjusting, by the at least first spectrum agent, a frequency channel and return a selected portion of the channel to the channel pool in response to a request by the spectrum manager.

12. The method of claim 1 including assigning, by the at least first spectrum agent, in response to a request by the spectrum manager, more users of one application to a frequency channel and returning previously allocated channel/channels for the users for assignment to other applications.

13. The method of claim 1 wherein predetermined priorities are assigned to the plurality of different applications in accordance with a predetermined scheme.

14. The method of claim 13 wherein predetermined priorities are further assigned to individual users of the plurality of different applications in accordance with the predetermined scheme.

15. The method of claim 1 including reallocating, by the at least first spectrum agent, channels that become available by decreasing service to its set of users, while still meeting a predetermined minimum level of service and returning the channels to the spectrum manager upon request.

16. A system for efficient management of a channel pool that is allocated among a plurality of different applications and has a predetermined number of frequency channels for a plurality of users in a communication system, wherein spectrum frequency of the channel pool is dynamically spread among the plurality of different applications to optimize provision of application requirements for the plurality of different applications in use, the system comprising:

a spectrum manager, for distributing, and dynamically allocating spectrum frequency among the plurality of users, in accordance with a predetermined scheme and a plurality of spectrum agents, operably coupled to the spectrum manager and to the plurality of users, wherein the plurality of spectrum agents assign frequency channel/channels for different applications to the plurality of users in a predetermined service area, in accordance with the predetermined scheme, wherein the predetermined scheme includes:

A) assigning at least a first spectrum agent of the plurality of spectrum agents to each of the plurality of different applications, for managing channels allocated to an application of the plurality of different applications;

B) allocating, by the spectrum manager, frequency channel/channels to the plurality of different applications based on the following at least one of:

B1) parameters of a frequency channel required to implement the application; and B2) predetermined requirements based on time of day demand changes for the application wherein the at least first spectrum agent monitors all frequency channels currently allocated to the at least first spectrum agent and maintains current information for quality and usage metrics for each of the frequency channels allocated for the use of the application assigned to the at least first spectrum agent.

17. The system of claim 16 wherein coaxial cable is utilized to couple at least some of the plurality of users to the communication system.

18. The system of claim 16 wherein fiber optic cable is utilized to couple at least some of the plurality of users to the communication system.

19. The system of claim 16 wherein the parameters of the frequency channel required to implement the application include at least one of: quality, bandwidth and intermediate frequency.

20. The system of claim 16 wherein time of day requirements are based on one of:

a requirement reconfigured for the application at predetermined times of day, and historical information on the application's time of day requirements.

21. The system of claim 16 wherein, in accordance with a predetermined scheme, the at least first spectrum agent classifies the channels assigned to the at least first spectrum agent's application as one of: assigned, available and out of service and conveys the information to the spectrum manager.

22. The system of claim 21 wherein the at least first spectrum agent further reassigns out of service channels to the plurality of different applications having more lenient quality requirements than the application for which a channel was classified out of service.

23. The system of claim 21 wherein the at least first spectrum agent further reassigns an out of service frequency channel of one application to an available channel from another application having more lenient quality requirements.

24. The system of claim 16 including requesting, by the spectrum manager, at least one spectrum agent of the plurality of spectrum agents to return a particular channel allocated to the at least one spectrum agent.

25. The system of claim 16 including requesting, by the spectrum manager at least one of:

at least one channel; and at least one prioritizing channel for a specific application based on the characteristics of the channel.

26. The system of claim 16 including rate-adjusting, by the at least first spectrum agent, a frequency channel and returning a selected portion of a channel to the channel pool in response to a request by the spectrum manager.

27. The system of claim 16 including assigning, by the at least first spectrum agent, in response to a request by the spectrum manager, more users of one application to a frequency channel and returning previously allocated channel/channels for the users for assignment to other applications.

28. The system of claim 16 wherein predetermined priorities are assigned to the plurality of different applications in accordance with a predetermined scheme.

29. The system of claim 28 wherein predetermined priorities are further assigned to individual users of the plurality of different applications in accordance with the predetermined scheme.

30. The system of claim 16 including reallocating, by the at least first spectrum agent, channels that become available by decreasing service to the at least first spectrum agent's set of users, while still meeting a predetermined minimum level of service and returning said channels to the spectrum manager upon request.

* * * * *